Dec. 23, 1941.  C. A. TEA  2,267,433
WEATHER STRIP
Filed Oct. 31, 1938
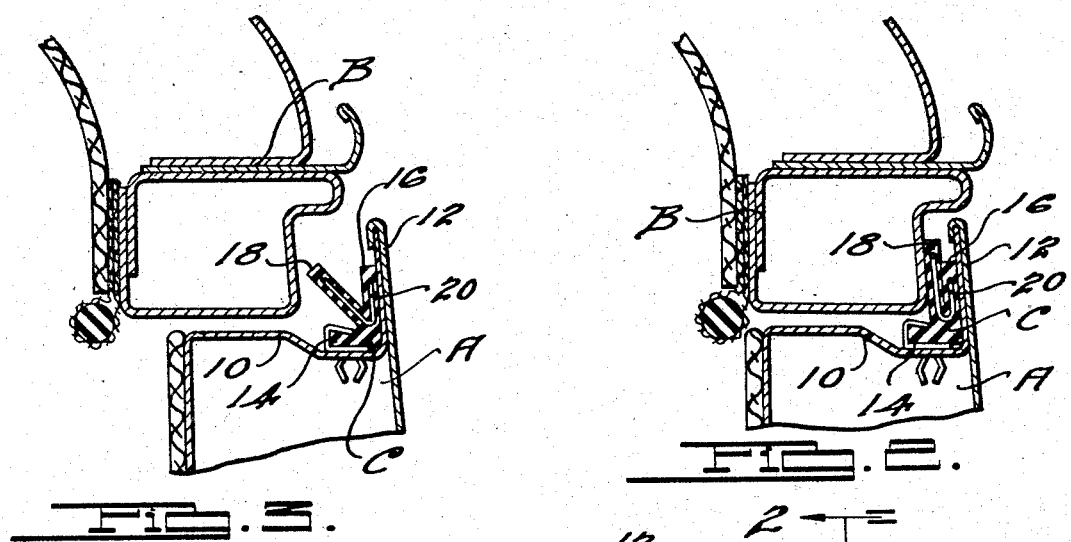
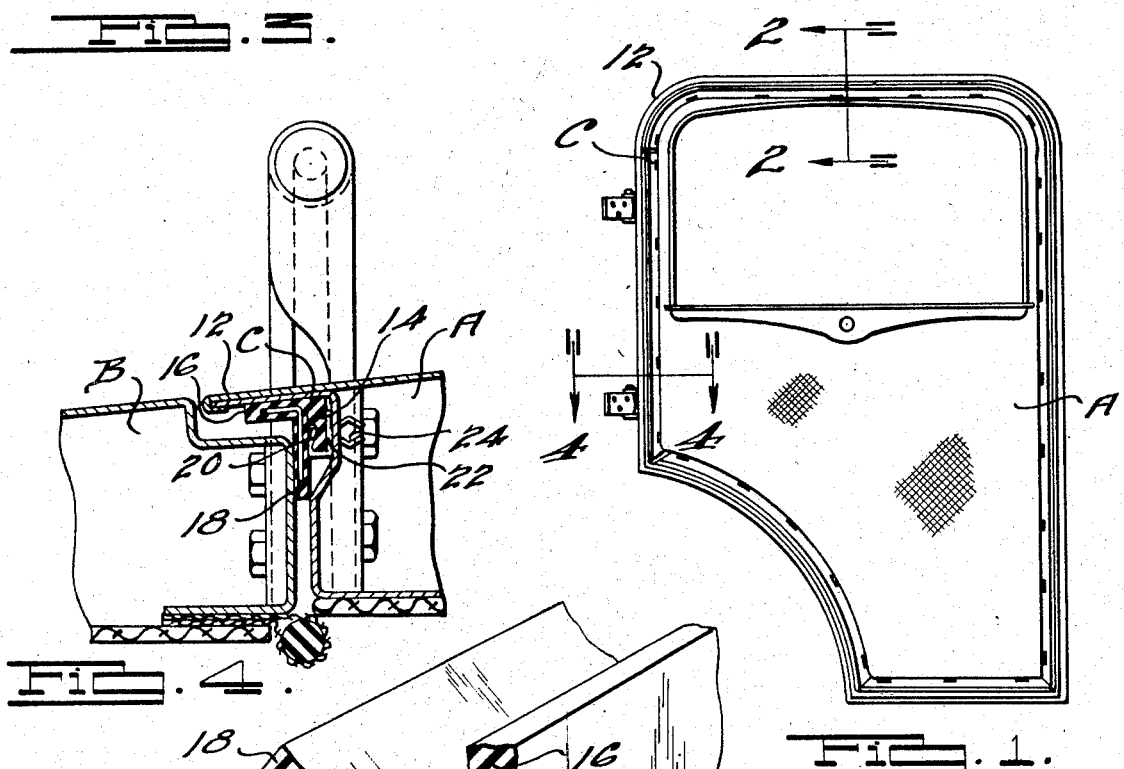
INVENTOR
Clark A. Tea.
BY Harness, Lind, Patee & Harris
ATTORNEYS.

Patented Dec. 23, 1941

2,267,433

UNITED STATES PATENT OFFICE 2,267,433

WEATHER STRIP

Clark A. Tea, Detroit, Mich., assignor to Chrysler Corporation, Highland Park, Mich., a corporation of Delaware Application October 31, 1938, Serial No. 237,821

1 Claim. (Cl. 20—69)

This invention relates to a weatherstrip and more particularly to a weatherstrip especially adapted for use on motor vehicle bodies to seal the opening around the doors or windows.

An object of the invention is to provide a weatherstrip which is strong, inherently resilient, and inexpensive to manufacture.

Another object of the invention is to provide a weatherstrip which may be continuously formed such as by the extrusion process and preferably formed from rubber which is free to bend and conform to the parts to which the strip is applied.

A further object of the invention is to provide a strip having a plurality of flanges, formed of a different hardness of rubber so that one flange is comparatively harder than another to serve as an attaching portion and to provide a resilient member within another flange to increase its resiliency.

Other objects and advantages of the invention will more fully appear from the following description taken in connection with the accompanying drawing, in which:

Fig. 1 is a view showing in side elevation an automobile door with the improved weatherstrip applied to the edges thereof.

Fig. 2 is a sectional view taken on line 2—2 of Fig. 1 showing the door closed.

Fig. 3 is a sectional view corresponding to Fig. 2, showing the door open.

Fig. 4 is a sectional view taken on line 4—4 of Fig. 1.

Fig. 5 is a perspective view of a portion of the strip, parts being broken away and in section.

Referring to the drawing, an automobile door is shown at A and a portion of the automobile body is shown at B. The door A is provided with an edge flange 10 and an overlap flange 12 substantially at right angles to the flange 10. The weatherstrip C is secured to the flange 10 and lies in the corner formed by the two flanges 10 and 12.

The weather strip comprises two flanges 14 and 16 substantially at right angles to each other and joined at their adjacent edges. Another flange 18 is arranged between the flanges 14 and 16 and extends diagonally having one edge thereof joined to the flanges 14 and 16 at substantially the juncture of said flanges 14 and 16.

All flanges are preferably formed from rubber and while they are pliable the flange 14 is formed of a rubber which is comparatively harder than the flanges 16 and 18 to provide a more rigid attaching portion. If desired, the flange 16 may be of the same hardness but the flange 18 is preferably more flexible to fit the parts to be sealed.

In order to increase the rigidity of the flange 18 and yet maintain its flexibility there is provided a looped resilient wire member 20 embedded in the flanges 16 and 18. This wire gives the flange resiliency and yet when the flange is bent beyond its elastic limit it takes a permanent set and is flexible and resilient from that point. This is desirable in applying the weatherstrip to irregular shapes such as an automobile door.

On the hinge side of the door the flange 18 is bent toward the flange 14 as shown in Fig. 4. On the opposite side of the door and at the top and bottom the flange is bent toward the flange 16 as shown in Fig. 2. The flexibility of the flange 18 and the resiliency of the embedded wire permits this deformation of the flange 18 at the proper place approximately at the upper and lower corner on the hinge side of the door.

The weatherstrip is attached to the door by fasteners 22 which are fastened to the more rigid flange 14 and provided with resilient snaps 24 which are forced through openings in the door. Figs. 2, 3 and 4 show fasteners of the well-known snap type. In Fig. 5 there is shown a moulded button 26 on the flange 14 which may be snapped into an opening on the door for detachably securing the weatherstrip to a support.

It will be understood that various changes including the size, shape and arrangement of parts may be made without departing from the spirit of my invention and it is not my intention to limit its scope other than by the terms of the appended claim.

I claim:

A weatherstrip comprising a continuous rubber strip having a pair of joined side flanges at right angles to each other, a central diagonally extending flange joined to said flanges substantially at their point of juncture, one of said side flanges being formed of harder rubber than said central diagonally extending flange, means on said harder side flange for securing it to a support, and a resilient looped wire member embedded within one of said side flanges and said central diagonally extending flange.

CLARK A. TEA.